United States Patent [19]

Engelsmann et al.

[11] 4,350,423
[45] Sep. 21, 1982

[54] STILL CAMERA WITH A RETRACTABLE OBJECTIVE

[75] Inventors: Dieter Engelsmann, Unterhaching; Reinhard Nicko, Munich; Wilfried Bittner, Alxing; Horst Karl, Munich, all of Fed. Rep. of Germany

[73] Assignee: Agfa-Gevaert Aktiengesellschaft, Leverkusen, Fed. Rep. of Germany

[21] Appl. No.: 281,892

[22] Filed: Jul. 9, 1981

[30] Foreign Application Priority Data

Jul. 26, 1980 [DE] Fed. Rep. of Germany ....... 3028452

[51] Int. Cl.³ ........................ G03B 1/12; G03B 13/02; G03B 3/00
[52] U.S. Cl. .................................... 354/173; 354/195; 354/219
[58] Field of Search ........................ 354/173, 212, 195

[56] References Cited

U.S. PATENT DOCUMENTS

| | | | |
|---|---|---|---|
| 4,012,754 | 3/1977 | Waaske | 354/212 |
| 4,258,998 | 3/1981 | Lermann et al. | 354/173 |
| 4,294,527 | 10/1981 | Hashimoto et al. | 354/173 X |

FOREIGN PATENT DOCUMENTS

| | | |
|---|---|---|
| 2841606 | 8/1979 | Fed. Rep. of Germany . |
| 3003759 | 8/1980 | Fed. Rep. of Germany . |
| 1174016 | 11/1958 | France ............................. 354/212 |
| 918075 | 2/1963 | United Kingdom ............... 354/173 |

Primary Examiner—Donald A. Griffin
Attorney, Agent, or Firm—Michael J. Striker

[57] ABSTRACT

A photographic camera has a housing, a viewfinder, an objective displaceable between extended and retracted positions relative to the housing, a device for displacing the objective between the extended and retracted positions, a film transporting device, a film take-up spool, an electric motor rotatable in two opposite directions and arranged so that when the electric motor rotates in one of the directions it is coupled with the objective displacing device, and when the motor rotates in the other of the directions it is coupled with the film transporting device and the film take-up spool, a switching element for reversing the electric motor, and a locking device for the film take-up spool, coupled with the switching element so that when the electric motor is switched for rotation in the one direction for displacing the objective and is coupled with the objective displacing device the film take-up spool is locked against rotation, and when the electric motor is reversed and uncoupled the film take-up spool is released.

13 Claims, 2 Drawing Figures

STILL CAMERA WITH A RETRACTABLE OBJECTIVE

BACKGROUND OF THE INVENTION

The present invention relates to still cameras, advantangeously miniature cameras, with a viewfinder, an extensible and retractible objective, and a reversible electric motor which during its rotation in one direction is coupled with an objective-displacing device and during its rotation in the opposite direction is coupled with a film transport transmission and a film take-up spool, wherein a switching device is provided for reversing the motor.

Cameras of the above-mentioned general type are known in the art. In cameras of the above described construction, it is possible that overlapping of the picture field for individual pictures in the film gate of the camera takes place, as a result of the film pulling action on the film take-up spool.

SUMMARY OF THE INVENTION

Accordingly, it is an object of the present invention to provide a camera in which during the displacement of the objective and simultaneous uncoupling of the film take-up spool from the motor, no overlapping of the picture fields for the individual pictures takes place in the film gate of the camera.

In keeping with this object, and with others which will become apparent hereinafter, one feature of the present invention resides, briefly stated, in a photographic camera in which locking means is provided for the film take-up spool and coupled with the motor switching means, so that when the electric motor is switched for rotation in a direction for displacing the objective and coupled with the objective-displacing device, the film take-up spool is locked against rotation, and when the electric motor is reversed and uncoupled, the film take-up spool is released. When the photographic camera is designed in accordance with the present invention, the above-mentioned overlapping of the picture fields for individual pictures cannot take place.

The novel features which are considered characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
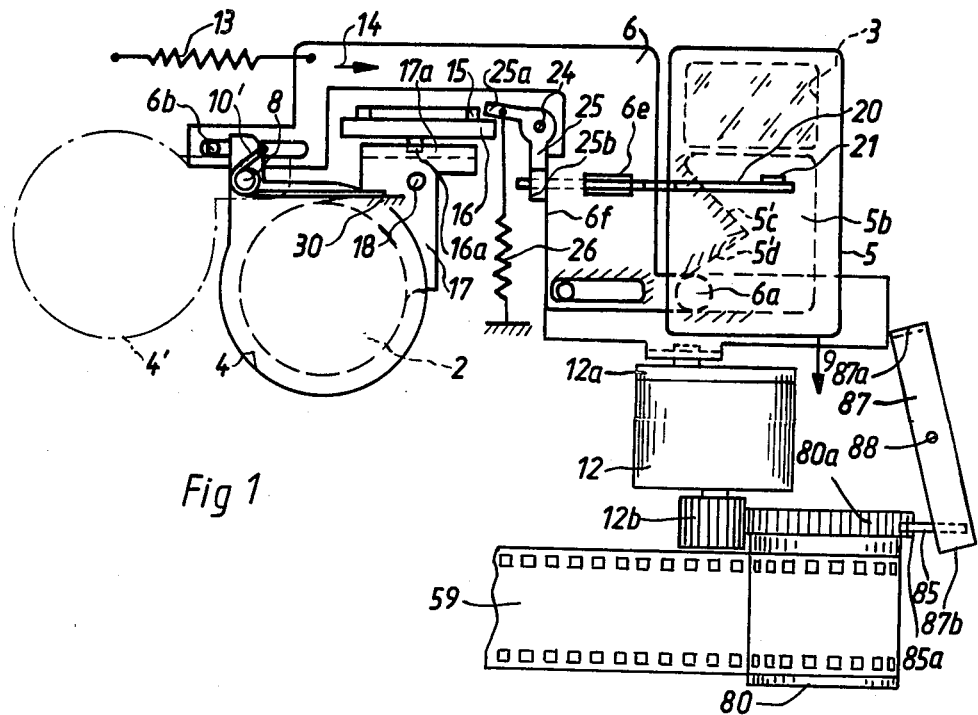
FIG. 1 is a view showing a photographic camera in accordance with the present invention in direction toward the objective and the film plane with a removed housing, wherein parts located one behind the other are shown for the sake of clarity as located partially one below the other.

A photographic camera, preferably a miniature photographic camera, is shown in the drawing. Its housing is removed for the sake of clarity.

The camera has an objective or an objective mount which is identified by reference numeral 2. A viewfinder is arranged laterally adjacent to the objective 2 in the upper part of the housing. The viewfinder has an inlet opening or a front lens which is identified by reference numeral 3. A cover plate 4 is movably arranged in front of the objective 2 and is insertable or pivotable behind the front side of the camera housing. When the camera is not used, the cover plate 4 is displaced so that it is located in front of the objective 2, and the latter is protected against damage and dirtying. The front lens 3 of the viewfinder is arranged in a cavity of the front side of the camera. A cover slider 5 is arranged displaceably so that it moves between one end position in which it covers the front lens 3 of the viewfinder and another end position in which it releases the same.

There is a possibility that a user displaces only the cover slider 5 to the working position shown in dotted lines and, since he can now look through the viewfinder, forgets that the objective 2 is still closed by the cover plate 4. In order to avoid this, the cover slider 5 is formed as a handle for joint displacement of the cover slider 5 of the viewfinder and the cover plate 4 of the objective to their working positions, for example 4', or their closed positions.

Figure 2:
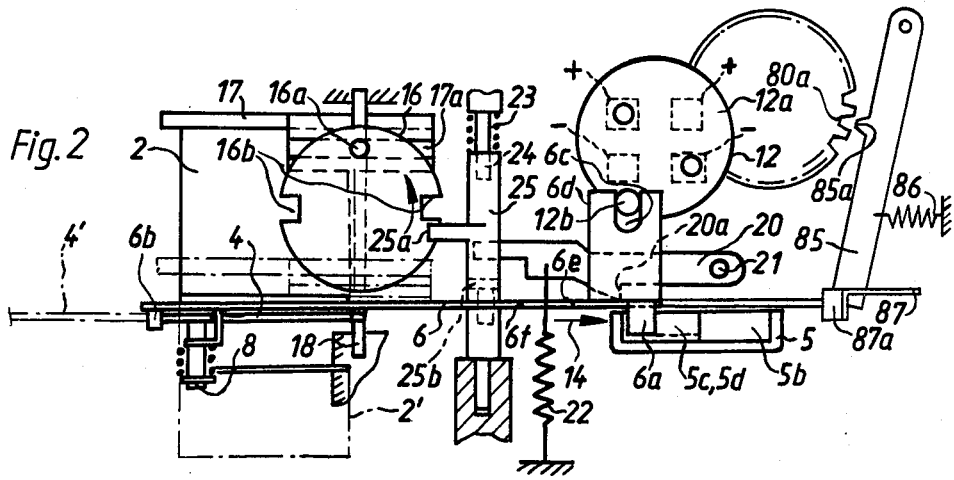
FIG. 2 is a plan view of the photographic camera of FIG. 1.

In FIG. 2, the objective 2 is shown in its nonworking position, in which it is inserted into the camera, as shown in solid lines. For the use of the camera, the objective 2 is displaced out of the camera housing to the working position shown in dotted lines, after withdrawing of the cover plate 4. The joint movement of the cover slider 5 of the viewfinder, the cover plate 4 of the objective, and the objective itself is performed with the aid of an electric motor 12 which can alternately rotate in opposite directions for driving a film take-up spool 80 and a film transport of the film 59, on the one hand, and for the displacement of the objective, on the other hand. For this purpose, a drive coupling is provided between the motor 12 and a motor pinion 12b' or between a spool gear 80a and a spool 80 at respective locations. The drive coupling acts only in a direction of film take-up on the spool 80 so that the spool can be taken along only in the winding direction when the motor 12 rotates in a direction which is opposite to the objective-displacement direction.

The motor 12 is provided with a rotary switch 12a which changes polarity in the event of rotation from the position shown in FIG. 2 for film transporting by an angle of 90°. A pin 12b of the rotary switch 12a engages in a slot 6c of a strip 6d of a slider 6, whereby the pin 12b and the slot 6d are so arranged that during movement of the slider 6 from its one end position to its other end position, the motor changes the polarity. Simultaneously, during the movement of the slider 6 in its position which corresponds to the working position of the viewfinder 3 and the cover plate 4 of the objective 2, not only the motor changes the polarity relative to its position corresponding to the film transport position, but it is also simultaneously switched on. The cover slider 5 of the viewfinder has a control slot 5b which is formed as a large recess with two oppositely running identical control curves 5c and 5d. The pin 6a of the slider 6 abuts against the control curves 5c and 5d under the action of a spring 13. The cover plate 4 of the objective and a driving part 6b are so arranged that during the movement of the cover slider 5 of the viewfinder in direction of the arrow 9, the slider 6 first moves in direction of the arrow 14 and thereby pivots the cover plate 4 of the objective into its working position 4' shown in dotted lines. In this position, the slider 6 and the cover plate 4 are locked, as will be described hereinbelow. During further displacement of the cover slider 5 of the viewfinder into its position which releases the viewfinder 3, the motor 12, 12a changes its polarity in the above-described manner and is switched on, and the slider 6 locked with the interval is released by the control curve 5c to allow return to its inoperative position.

A known gear transmission with a one-way coupling (not shown in the drawing) is provided between the motor 12 and the objective 2 or its mount. As a result of this, a gear 15 can be driven only in the clockwise direction. The gear 15 is connected with an eccentric disk 16, 16a. The eccentric disk has two recesses 16b which are offset by 90° relative to an eccentric pin 16a and arranged diametrically opposite to one another. The objective mount 3 is provided with a carrier plate 7 which is displaceable along an axis 15 extending parallel to the axis of the objective and has a groove 17a normal to the axis 18. An eccentric pin 16a engages in the groove 17a.

When the eccentric rotates by 180° by the slider 6 when the motor 12 is switched on, the objective 2 is displaced from the position shown in solid lines in FIG. 2 to the position shown in dotted lines outwardly of the camera, after removal of the cover plate 4. The latter position is identified by reference numeral 2'. The pin 6a and the slot 6c are so dimensioned that the motor 12, 12a is first switched on when the cover plate 4 fully releases the objective 2. When the cover slider 5 of the viewfinder thereby moves opposite to the direction of arrow 9 for closing the camera, the slider 6 is moved in direction of the arrow 14 through the control curve 5c and changes the polarity of the motor from its condition corresponding to the film transport position and switches on the same. In this case, the eccentric 16a rotates in the counterclockwise direction by 180° further and displaces back the objective 2 into the housing of the camera.

After the movement of the slider 6 in the direction of arrow 14, despite the preparatory release of the slider 6 by the respectively oppositely running curves 5c, 5d during opening of the camera or closing of the same, the slider 6 holds the switch 12a in the changed-pole closed position until the objective 2 is completely withdrawn from or inserted into the camera, the slider 6 will be temporarily locked in its position in direction of the arrow 14. For this purpose, the slider 6 has a raised strip 6e, and a projection 20a of a lever 20 pivotable about an axle 21 abuts against the strip 6e in the non-working position of the slider 6. The lever 20 is pulled against the strip 6e under the action of a spring 22 so that the projection 20a lowers behind the strip 6e when the slider 6 reaches its end position in direction of the arrow 14. Finally, a lever 25 is provided which is displaceable under the action of a spring 23 on an axle 24. The lever 25 has a lever arm 25a which is pulled under the action of a spring 26 against the outer surface of the eccentric disk 16 or its recesses 16b.

When the eccentric disk 16 rotates by approximately 180° after the extension or retraction of the objective 2, the lever arm 25a engages in the directly passing recess 16b and is displaced by the same against the action of the spring 23 on the axle 24. Thereby, a projection 25b takes along the lever 20 in clockwise direction so that its projection 20a is lifted from the strip 6e. The slider 6 is released for return to its non-working position against the direction of the arrow 14 and runs down under the action of the spring 13. The switch 12, 12a displaces in clockwise direction to its open initial position shown in FIG. 2. Approximately near the end of its return movement, the slider 6 acts by its edge 6f on the lever arm 25b of the lever 25 and rotates the same in clockwise direction to the position shown in FIG. 1. During this rotation, the lever arm 25a runs out of engagement with the recess 16b and somewhat moves back under the action of the spring 23 to the position shown in FIG. 2, so that it again lies above the eccentric disk 16; compare FIG. 1. During the next actuation of the cover slider 5 and the slider 6, the lever arm is again released by the edge 6f for abutting against the eccentric disk 16 or engaging in a recess 16a.

During return movement of the slider 6 against the direction of arrow 14 after the release by the lever 20, the slider 6, 6b releases at the end of its movement also the cover plate 4 for displacement to its position in which the cover plate 4 closes the objective 2. When in the respective position of the slider 6, as a result of the release of the viewfinder 3 by the cover slider 6, the objective is extended out of the camera, the cover plate 4 abuts against the objective mount and is thereby held in its open position. The viewfinder and the objective are in their preparatory positions. When the slider 6 assumes its returned position after the movement of the cover slider 5 of the viewfinder in which the viewfinder is closed, the cover plate 4 is released from the objective inserted into the camera and pivots under the action of the spring 10 in front of the objective 2 so as to close the latter. An abutment 30 fixedly connected with the housing is provided for the closed position of the cover plate 4 of the objective.

Since during the motor-driven movement of the objective out of and into the housing of the camera the spool 80 is not coupled with the motor 12, it can rotate during this phase under the pulling action of the film. This leads to displacement of the film 59 in the film gate of the camera and to overlapping of individual pictures. Because of this, the take-up spool 80 must be secured against rotation during the movement of the objective by the motor 12.

For this purpose, an arm 87a of a lever 87 rotatable about an axle 88 abuts against the end of the slider 6. Another arm 87b of the lever 87 abuts against a locking lever 85 with a locking tooth 85a. Its spring 86 pulls the locking tooth 85a out of engagement with the gear 80 and thereby holds the arm 87a in abutment against the slider 6.

When the movement of the objective is performed by displacing the cover slider 5 in one of its two possible directions of movement, the slider 6 moves in the direction of arrow 14 and pivots via the lever 87 the locking tooth 85a into engagement with the gear 80a, so that the take-up spool 80 is secured against rotation and thereby the film 59 is secured in its position. Since the slider 6 assumes this position at the end of the movement of the objective, the spool 80 remains locked by the locking tooth 85a until the end of each movement of the objective and change of polarity of the motor 12 in the film transport position. When at the end of the movement of the objective—either for extension from the camera or retraction into the camera—the slider 6 is released for return to its shown initial position and thereby the motor 12 is reset to its film transport position, the lever arm 87 follows under the action of the spring 86. The locking lever 85 also follows the same under the action of the spring 86, so that the locking tooth 85a is lifted out of the gear 80a and it rotates during renewed actuation of the motor 12 in a take-up direction of the take-up spool.

Thus, during the rotation of the motor in one direction for the transport of the objective and in the other direction for driving of the film spool, it is guaranteed that the film spool and thereby the film cannot assume during the movement of the objective not moving and damaging intermediate positions.

It is to be understood that a slider can be utilized instead of the levers, and an interengaging coupling can be utilized instead of the frictional coupling, and vice versa. Instead of the cover slider 5 for reversing the motor 12, a special switching handle can be utilized for cooperating with the slider 6.

It will be understood that each of the elements described above, or two or more together, may also find a useful application in other types of constructions differing from the types described above.

While the invention has been illustrated and described as embodied in a photographic camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic camera, comprising a housing; a viewfinder; an objective displaceable between extended and retracted positions relative to said housing; means for displacing said objective between said extended and retracted positions; film transporting means; and film take-up spool; an electric motor rotatable in two opposite directions and arranged so that when said electric motor rotates in one of said directions it is coupled with said objective displacing means and when said electric motor rotates in the other of said directions it is coupled with said film transporting means and said film take-up spool; switching means for reversing said electric motor; and locking means for said film take-up spool, coupled with said switching means so that when said electric motor is switched for rotation in said one direction for displacing said objective and is coupled with said objective displacing means said film take-up spool is locked against rotation, and when said electric motor is reversed and uncoupled said film take-up spool is released.

2. A photographic camera as defined in claim 1; and further comprising means for coupling said electric motor with said objective displacing means, on the one hand, and said film transporting means and said film take-up spool, on the other hand, said coupling means including a transmission and one-way clutch means.

3. A photographic camera as defined in claim 1, wherein said switching means includes a switching element displaceable between two different positions in dependence upon the switching of the electric motor to a respective one of said directions of rotation, said locking means including a locking element connected with said switching element of said switching means.

4. A photographic camera as defined in claim 3, wherein said locking element of said locking means is connected with said switching element of said switching means in a frictional manner.

5. A photographic camera as defined in claim 3, wherein said locking element of said locking means is connected with said switching element of said switching means in interengaging manner.

6. A photographic camera as defined in claim 3, wherein said switching element of said switching means is formed as a slider, said locking element of said locking means being formed as a lever connected with said slider.

7. A photographic camera as defined in claim 3, wherein said switching element of said switching means is formed as a lever, said locking element of said locking means being formed as a slider connected with said lever.

8. A photographic camera as defined in claim 1; and further comprising a cover movable relative to said viewfinder between closed and open positions so as to cover and expose said viewfinder, respectively, said switching means being connected with said cover so that when said cover moves between said closed and open positions, said objective is displaced between said retracted and extended positions.

9. A photographic camera as defined in claim 8; and further comprising a further switching means arranged so that after terminating the displacement of said objective said first mentioned switching means is returned to its condition in which it is coupled with said film transporting means.

10. A photographic camera as defined in claim 8, wherein said cover of said viewfinder is formed as a handle.

11. A photographic camera as defined in claim 1, wherein said film take-up spool has a transmission including a toothed wheel, said locking means having a displaceable member provided with a locking tooth which is engageable with said toothed wheel of said transmission of said film winding spool.

12. A photographic camera as defined in claim 11, wherein said displacing member of said locking means is formed as a lever, said locking tooth being provided on said lever.

13. A photographic camera as defined in claim 11, wherein said displaceable member of said locking means is formed as a slider, said locking tooth being provided on said slider.

* * * * *